US009608436B2

(12) United States Patent
Barker

(10) Patent No.: US 9,608,436 B2
(45) Date of Patent: Mar. 28, 2017

(54) METHOD OF FAULT CLEARANCE

(71) Applicant: ALSTOM Technology Ltd, Baden (CH)

(72) Inventor: Carl David Barker, Straffordshire (GB)

(73) Assignee: General Electric Technology GmbH, Baden (CH)

( * ) Notice: Subject to any disclaimer, the term of this patent is extended or adjusted under 35 U.S.C. 154(b) by 163 days.

(21) Appl. No.: 14/402,648

(22) PCT Filed: May 16, 2013

(86) PCT No.: PCT/EP2013/060202
§ 371 (c)(1),
(2) Date: Nov. 20, 2014

(87) PCT Pub. No.: WO2013/174726
PCT Pub. Date: Nov. 28, 2013

(65) Prior Publication Data
US 2015/0340859 A1 Nov. 26, 2015

(30) Foreign Application Priority Data

May 24, 2012 (GB) .................................. 1209110.4

(51) Int. Cl.
*H02H 7/22* (2006.01)
*H02H 3/07* (2006.01)
(Continued)

(52) U.S. Cl.
CPC ................ *H02H 7/22* (2013.01); *H02H 3/07* (2013.01); *H02H 7/12* (2013.01); *H02H 7/268* (2013.01);
(Continued)

(58) Field of Classification Search
CPC . H01T 19/00; H02B 5/00; H02H 7/12; H02H 7/22; H02H 7/268
See application file for complete search history.

(56) References Cited

U.S. PATENT DOCUMENTS

2003/0123212 A1\* 7/2003 Dunk ................... H01H 47/325
361/160
2008/0031014 A1 2/2008 Young
(Continued)

FOREIGN PATENT DOCUMENTS

CN 1998126 7/2007
CN 101340140 1/2009
(Continued)

OTHER PUBLICATIONS

Merlin M M C et al., A New Hybrid Multi-Level Voltage-Source Converter with DC Fault Blocking Capability, 9$^{th}$ Institution of Engineering and Technology International Conference on AC and DC Power Transmission, Oct. 19, 2010, pp. 1-5.
(Continued)

*Primary Examiner* — Thienvu Tran
*Assistant Examiner* — Tien Mai
(74) *Attorney, Agent, or Firm* — Foley & Lardner LLP

(57) ABSTRACT

There is a method of fault clearance for a voltage source converter that interconnects a DC network and an AC network. The voltage source converter is connected to the DC network via one or more DC circuit interruption devices. The method comprises the steps of: (a) detecting a fault in the DC network; (b) carrying out a primary protection sequence, wherein the step of carrying out the primary protection sequence involves carrying out a first sub-sequence that includes the steps of: i. opening the or each DC circuit interruption device, ii. setting a DC power order of the voltage source converter to zero, iii. controlling the
(Continued)

voltage source converter to exchange re-circuit breaker active power with the AC network.

4 Claims, 3 Drawing Sheets

(51) Int. Cl.
*H02H 7/12* (2006.01)
*H02H 7/26* (2006.01)
*H02H 11/00* (2006.01)
*H02J 3/36* (2006.01)
*H02M 7/483* (2007.01)

(52) U.S. Cl.
CPC ............... *H02H 11/00* (2013.01); *H02J 3/36* (2013.01); *H02M 2007/4835* (2013.01); *Y02E 60/60* (2013.01)

(56) References Cited

U.S. PATENT DOCUMENTS

| | | |
|---|---|---|
| 2009/0009920 A1 | 1/2009 | Yamada |
| 2010/0066174 A1 | 3/2010 | Dommaschk et al. |
| 2010/0208393 A1* | 8/2010 | Vedula .................... H02H 7/26 361/18 |
| 2013/0127643 A1 | 5/2013 | Malarky |

FOREIGN PATENT DOCUMENTS

| | | |
|---|---|---|
| EP | 2 795 645 | 10/2014 |
| WO | WO-2010/145689 | 12/2010 |
| WO | WO-2010/145705 A1 | 12/2010 |
| WO | WO-2011/012174 | 2/2011 |
| WO | WO2011029480 A1 | 3/2011 |
| WO | WO-2011/124260 | 10/2011 |
| WO | WO-2011/157300 | 12/2011 |
| WO | WO-2012/000545 | 1/2012 |
| WO | WO-2012/013248 | 2/2012 |
| WO | WO-2013/127642 | 9/2013 |
| WO | WO-2013/127643 | 9/2013 |

OTHER PUBLICATIONS

Robert S Whitehouse, Technical Challenges of Realising Multi-terminal Networking with VSC, Power Electronics and Applications (EPE 2011) Proceedings of the 2011-14*th* European Conference, Sep. 1, 2011, pp. 1-12.
International Search Report and Written Opinion for PCT Application No. PCT/EP2013/060202, mailed Oct. 14, 2013, 10 pages.
Asplund et al., DC Transmission based on Voltage Source Converters, Cigrè SC14 Colloquium, South Africa, 1997, 8 pages.
Lings, Raymond James, HVDC Handbook, First Edition, EPRI (Electrical Power Research Institute), Chapter 12, Jan. 1995, p. 231.
Jacobson, Jurgen, Proactive Hybrid HVDC Breakers—A key innovation for reliable HVDC grids, www.cigre.org, The Electrical Power System of the Future—Integrating Symposium, Sep. 2011, 9 pages.
Abstract of International Standard IEC60633, Terminology for high-voltage direct current (HVDC) transmission, 1 page (Jul. 29, 2015).
Browne, Jr., Extract of Section 1.1 from Circuit Interruption Theory and Techniques, 1 page (1984).
Cigre Technical Brochure 269, VSC Transmission, 162 pages (Apr. 2005).

\* cited by examiner

METHOD OF FAULT CLEARANCE

CROSS REFERENCE TO RELATED APPLICATIONS

The present application is a National Stage of International Application No. PCT/EP2013/060202, filed May 16, 2013, which claims priority to United Kingdom Application No. 1209110.4, filed May 24, 2012, which is incorporated herein by reference in its entirety.

This invention relates to a method of fault clearance for a voltage source converter.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of power transmission on lines and/or cables.

The conversion of AC to DC power is also utilized in power transmission networks where it is necessary to interconnect AC networks operating at different frequencies. In any such power transmission network, converters are required at each interface between AC and DC power to effect the required conversion.

According to an aspect of the invention, there is provided a method of fault clearance for a voltage source converter (VSC) that interconnects a DC network and an AC network, the voltage source converter being connected to the DC network via one or more DC circuit interruption devices, the method comprising the steps of:
(a) detecting a fault in the DC network;
(b) carrying out a primary protection sequence, wherein the step of carrying out the primary protection sequence involves carrying out a first sub-sequence that includes the steps of:
  i. opening the or each DC circuit interruption device,
  ii. setting a DC power order of the voltage source converter to zero,
  iii. controlling the voltage source converter to exchange reactive power with the AC network.

Opening a circuit interruption device refers to the use of the circuit interruption device to open a closed circuit to interrupt current flow in the circuit, while closing a circuit interruption device refers to the use of the circuit interruption device to complete an open circuit to permit current flow in the circuit.

A circuit interruption device may be any device that is capable of interrupting current flow in a circuit. Such a circuit interruption device may be, but is not limited to, a circuit breaker.

The occurrence of one or more faults occurring in the DC network may lead to one or more fault currents flowing through the DC network. The fault may, for example, be in the form of a short circuit with low impedance across DC power transmission cables. This may occur due to damage or breakdown of insulation, lightning strikes, movement of conductors or other accidental bridging between conductors by a foreign object.

The presence of one or more faults in the DC network can be detrimental to a VSC. Sometimes the inherent design of the converter means that it cannot limit current under such conditions, resulting in the development of a high fault current.

The method according to the invention allows a fault that is detected in the DC network to be cleared by opening the or each DC circuit interruption device in order to disconnect the VSC from the DC network. The or each DC circuit interruption device may be opened by either locally operating the or each DC circuit interruption device, or remotely sending a control signal to the or each DC circuit interruption device. Disconnecting the VSC from the DC network interrupts a supply of current from the AC network that feeds the fault in the DC network via the VSC. This allows the fault to be cleared. For example, when the fault is in the form of an external flashover, opening the or each DC circuit interruption device removes DC side circulating current from the DC network, which then allows the fault to deionise rapidly.

Meanwhile the VSC is controlled to exchange reactive power with the AC network in order to provide control over the AC voltage level of the AC network. This removes the risk of an AC undervoltage or overvoltage in the AC network, which could lead to unwanted circumstances in the AC network, such as cascade tripping. In addition, the exchange of reactive power between the VSC and the AC network allows the VSC to remain energised during the event of fault clearance in the DC network. This in turn allows the DC network to be rapidly energised from the VSC when the or each DC circuit interruption device is closed to reconnect the VSC to the DC network.

On the other hand, an AC circuit interruption device may be used to remove the supply of current that feeds the fault in the DC network via the VSC. The use of the AC circuit interruption device in this manner however requires disconnection of the VSC from the AC network. This thereby prevents the VSC from exchanging reactive power with the AC network during the event of fault clearance in the DC network.

It will be appreciated that the method according to the invention may be used with various types of VSCs. Such VSCs include, but are not limited to, two-level converters, multi-level converters and multi-module converters.

It will also be appreciated that the AC network may be a single-phase or multi-phase AC network.

In embodiments of the invention, the step of carrying out the primary protection sequence may involve the steps of:
  a. counting a re-close time;
  b. carrying out the first sub-sequence;
  c. checking whether the re-close time has elapsed; and
  d. repeating the first sub-sequence if the re-close time has not elapsed.

A circuit interruption device may be configured to automatically re-close after a certain re-close time. This removes the need to locally reset the circuit interruption device in order to close the circuit interruption device.

In the method according to the invention, the first sub-sequence is repeated until the re-close time elapses, i.e. until the or each DC circuit interruption device is required to re-close.

In such embodiments, the step of carrying out the primary protection sequence further involves the step of carrying out a second sub-sequence if the re-close time has elapsed, the second sub-sequence including the steps of:
  i. closing the or each DC circuit interruption device;
  ii. setting a DC power order of the voltage source converter to a non-zero level that is below a pre-fault DC power order of the voltage source converter;
  iii. controlling the voltage source converter to exchange reactive power with the AC network;
  iv. detecting whether the fault is still present in the DC network;
  v. restoring the DC power order of the voltage source converter to its pre-fault value if the fault is not detected in the DC network, and repeating the step of carrying out the primary protection sequence if the fault is detected in the DC network.

When the re-close time has elapsed, the or each DC circuit interruption device is closed in order to re-energise the DC network from the VSC, albeit at a DC power order of the voltage source converter that is lower than its pre-fault value. Meanwhile the VSC is controlled to continue exchanging reactive power with the AC network. A detection step is then carried out to determine whether the fault is still present in the DC network. If it has been determined that the fault is no longer present in the DC network, the DC power order of the voltage source converter is restored to its pre-fault value, and the VSC resumes its normal operation of transferring power between the AC and DC networks.

The method according to the invention therefore provides a reliable way of clearing a fault for the VSC that interconnects the DC network and the AC network, and re-energising the DC network through automatic re-closing of the or each DC circuit interruption device before restoring the DC network to its normal operating conditions.

However, if the fault still persists in the DC network, the primary protection sequence is repeated so as to again attempt to restore the DC network to its normal operating conditions.

Preferably the primary protection sequence is repeated if the fault is detected in the DC network and if the number of times that the primary protection sequence has been carried out is below a predetermined number. The predetermined number is the maximum number of attempts to restore the DC network to its normal operating conditions through the primary protection sequence, and may vary depending on the operating requirements of the VSC and the associated power application.

The method according to the invention is advantageous in that reactive power exchange between the VSC and the AC network is maintained throughout the period of time during which the DC network is isolated from the voltage source converter.

The method preferably further includes the steps of:
i. opening the or each DC circuit interruption device;
ii. setting a DC power order of the voltage source converter to zero;
iii. controlling the voltage source converter to exchange reactive power with the AC network;
when the number of times that the primary protection sequence has been carried out is equal to the predetermined number.

In further embodiments of the invention, wherein the voltage source converter is connected to the AC network via one or more AC circuit interruption devices, the method may further include the step of carrying out a back-up protection sequence that involves the steps of:
a. counting a back-up protection time after the step of detecting a fault occurring in the DC network;
b. opening the or each AC circuit interruption device after the back-up protection time has elapsed;
c. switching the voltage source converter to a current blocking state.

The back-up protection sequence allows the fault in the DC network to be cleared, in the event that the primary protection sequence fails to clear the fault.

It is not essential for the or each AC circuit interruption device to be configured to automatically reclose, since the or each AC circuit interruption device only plays a role in the back-up protection sequence. This advantageously simplifies the control of the or each AC circuit interruption device.

A preferred embodiment of the invention will now be described, by way of a non-limiting example, with reference to the accompanying drawings in which.

A VSC 10 comprises first and second DC terminals 16,18, and three converter limbs 20.

Figure 1:
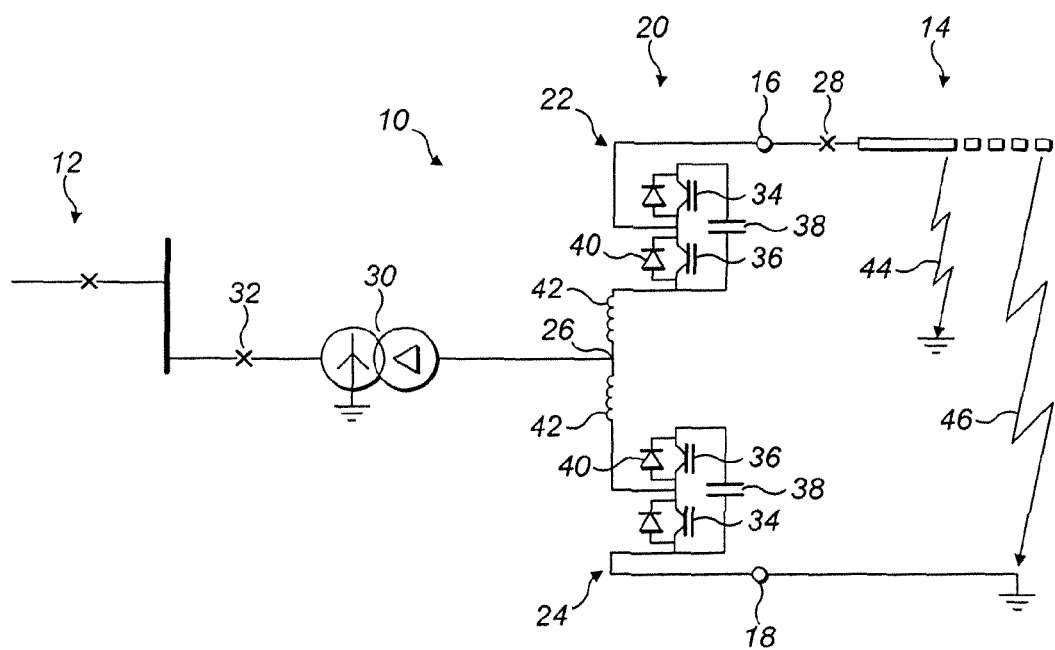
FIG. 1 shows, in schematic form, a first exemplary arrangement of a converter limb of a low impedance grounded VSC, an AC network and a DC network.

FIG. 1 shows, in schematic form, a first, monopole circuit arrangement of one of the converter limbs of the low impedance grounded VSC 10, a three-phase AC network 12 and a DC network 14. In the first arrangement, the structure and arrangement of the converter limb 20 shown in FIG. 1 is similar to the structure and arrangement of the other converter limbs 20 of the VSC 10.

Each converter limb 20 extends between the first and second DC terminals 16,18, and has first and second limb portions 22,24.

The VSC 10 further includes a plurality of AC terminals 26. The first and second limb portions 22,24 of each converter limb 20 are separated by a respective one of the plurality of AC terminals 26.

The first DC terminal 16 is connected to a first pole of the DC network 14 via a DC circuit breaker 28, while the second DC terminal 18 is connected to ground. The AC terminal 26 of each converter limb 20 is connected in series to a respective phase of the AC network 12 via a transformer 30 and an AC circuit breaker 32.

It is envisaged that, in other embodiments of the invention, the three-phase AC network 12 may be replaced by a single-phase AC network or another multi-phase AC network. In such embodiments, the VSC 10 may have either a single converter limb 20 or a plurality of converter limbs 20 so as to match the number of phases of the single-phase or multi-phase AC network, wherein the AC terminal 26 of the or each converter limb 20 is connected in series to a respective phase of the AC network 12 via a transformer 30 and an AC circuit breaker 32.

It is envisaged that, in other embodiments, each circuit breaker 28,32 may be replaced by another type of circuit interruption device.

In each converter limb 20, each of the first and second limb portions 22,24 includes a module 34 that is connected in series between the corresponding DC terminal 16,18 and the AC terminal 26. The module 34 includes a pair of switching elements 36 connected in parallel with a capacitor 38 to define a 2-quadrant unipolar module 34 that can provide a zero or positive voltage, and can conduct current in two directions. In the embodiment shown each switching element 36 is constituted by a semiconductor device in the form of an Insulated Gate Bipolar Transistor (IGBT). Each switching element 36 also includes an anti-parallel diode 40 connected in parallel therewith.

In use, the switching elements 36 of each module 34 are switched to control the phase and magnitude of an AC voltage at the corresponding AC terminal 26 and the magnitude of a DC voltage at the first terminal 16 in order to transfer power between the AC and DC networks 12,14.

In each converter limb 20, each of the first and second limb portions 22,24 further includes an inductor 42 that is connected in series with the 2-quadrant unipolar module 34 between the corresponding DC terminal 16,18 and the AC terminal 26.

It is envisaged that, in other arrangements, the 2-quadrant unipolar module 34 may be replaced by a plurality of series-connected 2-quadrant unipolar modules, so as to vary the voltage rating of the VSC 10.

It is envisaged that, in other arrangements, the VSC 10 in FIG. 1 may be replaced by another type of VSC, which may be, but is not limited to, a two-level converter, a multi-level converter and a multi-module converter.

The DC circuit breaker 28 further includes fault detection equipment (not shown) to locally carry out measurements of voltage and/or current characteristics of the DC network 14 to determine whether a fault is present in the DC network 14.

A fault in the DC network 14 may be in the form of a pole-to-ground fault 44 or a pole-to-pole fault 46, as shown in FIG. 1.

Figure 2:
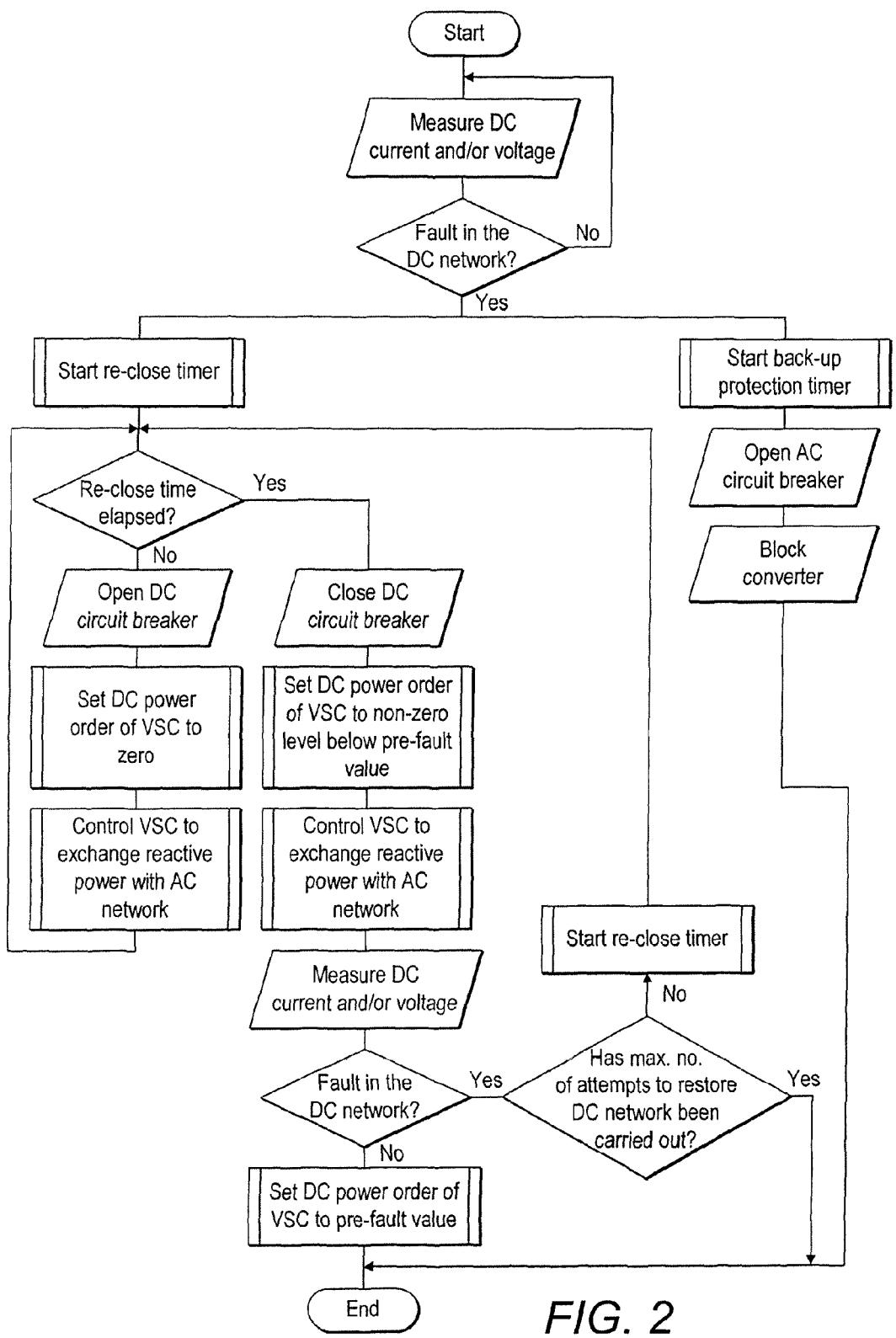
FIG. 2 illustrates a method of fault clearance for a voltage source converter according to an embodiment of the invention.

In the event of a fault 44,46 occurring in the DC network 14, a method of fault clearance for a VSC 10 according to an embodiment of the invention is carried out as follows, with reference to FIGS. 1 and 2. It will be appreciated that, although the method according to the invention is described with reference to the converter limb 20 shown in FIG. 1, the method according to the invention applies mutatis mutandis to the other converter limbs 20 of the VSC 10.

The fault detection equipment carries out measurements of voltage and/or current characteristics of the DC network 14 to determine whether a fault 44,46 is present in the DC network 14. When the fault detection equipment detects the fault 44,46 in the DC network 14, a primary protection sequence is carried out as follows.

In the primary protection sequence, a re-close timer is started to count a re-close time and a first sub-sequence of the primary protection sequence is carried out as follows.

The DC circuit breaker 28 is opened by, for example, locally opening the DC circuit breaker 28 or remotely sending a control signal to the DC circuit breaker 28. Opening the DC circuit breaker 28 interrupts a supply of current from the AC network 12 that feeds the fault in the DC network 14 via the VSC 10.

The DC power order of the voltage source converter 10 is set to zero, and the VSC 10 is controlled to exchange reactive power with the AC network 12 through switching of the switching elements 36 of each module 34.

Carrying out the first sub-sequence allows the fault in the DC network 14 to be cleared, and allows the VSC 10 to provide control over the AC voltage level of the AC network 12 during the event of fault clearance in the DC network 14. The exchange of reactive power between the VSC 10 and the AC network 12 also allows the VSC 10 to remain energised during the event of fault clearance in the DC network 14.

If the re-close time has not elapsed then the first sub-sequence is repeated.

After the re-close time has elapsed, a second sub-sequence of the primary protection sequence is carried out as follows.

The DC circuit breaker 28 is closed, and the DC power order of the voltage source converter 10 is set to a non-zero level below its pre-fault value.

Since the VSC 10 was maintained in an energised state during the first sub-sequence, the VSC 10 is able to rapidly energise the DC network 14 when the DC circuit breaker 28 is closed to reconnect the VSC 10 to the DC network 14.

Meanwhile the VSC 10 is controlled to exchange reactive power with the AC network 12 through switching of the switching elements 36 of each module 34, so as to continue maintaining the VSC 10 in an energised state and providing control over the AC voltage level of the AC network 12.

The fault detection equipment then carries out measurements of voltage and/or current characteristics of the DC network 14 to determine whether the fault 44,46 is still present in the DC network 14.

If the fault 44,46 is no longer present in the DC network 14, the DC power order of the DC network 14 is restored to its pre-fault value, and the VSC 10 resumes its normal operation of transferring power between the AC and DC networks 12,14.

However, if the fault 44,46 still persists in the DC network 14, a check is carried out to determine whether the number of times that the primary protection sequence has been carried out is below a predetermined number. The predetermined number is the maximum number of attempts to restore the DC network 14 to its normal operating conditions through the primary protection sequence, and may vary depending on the operating requirements of the VSC 10 and the associated power application.

If the number of times that the primary protection sequence has been carried out is below the predetermined number, the primary protection sequence is repeated so as to again attempt to restore the DC network 14 to its normal operating conditions.

When the number of times that the primary protection sequence has been carried out exceeds the predetermined number, the DC circuit breaker 28 is opened, the DC power order of the voltage source converter 10 is set to zero, and the VSC 10 is controlled to exchange reactive power with the AC network 12 through switching of the switching elements 36 of each module 34. The DC circuit breaker 28 is further configured to not automatically re-close. This allows the VSC 10 to remain energised through continuous exchange of reactive power with the AC network 12, so that it may rapidly energise the DC network 14 when the DC circuit breaker 28 is closed at a later time.

When the fault detection equipment initially detects the fault 44,46 in the DC network 14, a back-up protection sequence is also carried out as follows.

A back-up protection timer is started to count a back-up protection time after the fault 44,46 was detected in the DC network 14. Each AC circuit breaker 32 is opened after the back-up protection time has elapsed. The VSC 10 is then switched to a current blocking state.

The back-up protection sequence allows the fault 44,46 in the DC network 14 to be cleared, in the event that the primary protection sequence fails to clear the fault 44,46, and thereby protect the VSC 10 from a high fault current.

The method according to the invention therefore provides a reliable way of clearing a fault 44,46 for a VSC 10 that interconnects a DC network 14 and an AC network 12, without having to rely on disconnection of the VSC 10 from the AC network 12 as the primary method of protection. This permits continuous exchange of reactive power between the VSC 10 and the AC network 12 during the primary protection sequence to remove the risk of an AC undervoltage or overvoltage in the AC network 12, which could lead to unwanted circumstances in the AC network 12, such as cascade tripping.

The method according to the invention also provides a way of re-energising the DC network 14 through automatic re-closing of the or each DC circuit breaker 28 before restoring the DC network 14 to its normal operating conditions.

The number of DC circuit breakers 28 that are required to carry out the method according to the invention, as described above and shown in FIG. 2, may vary depending on the arrangement of the VSC 10, the AC network 12 and the DC network 14.

Figure 3:
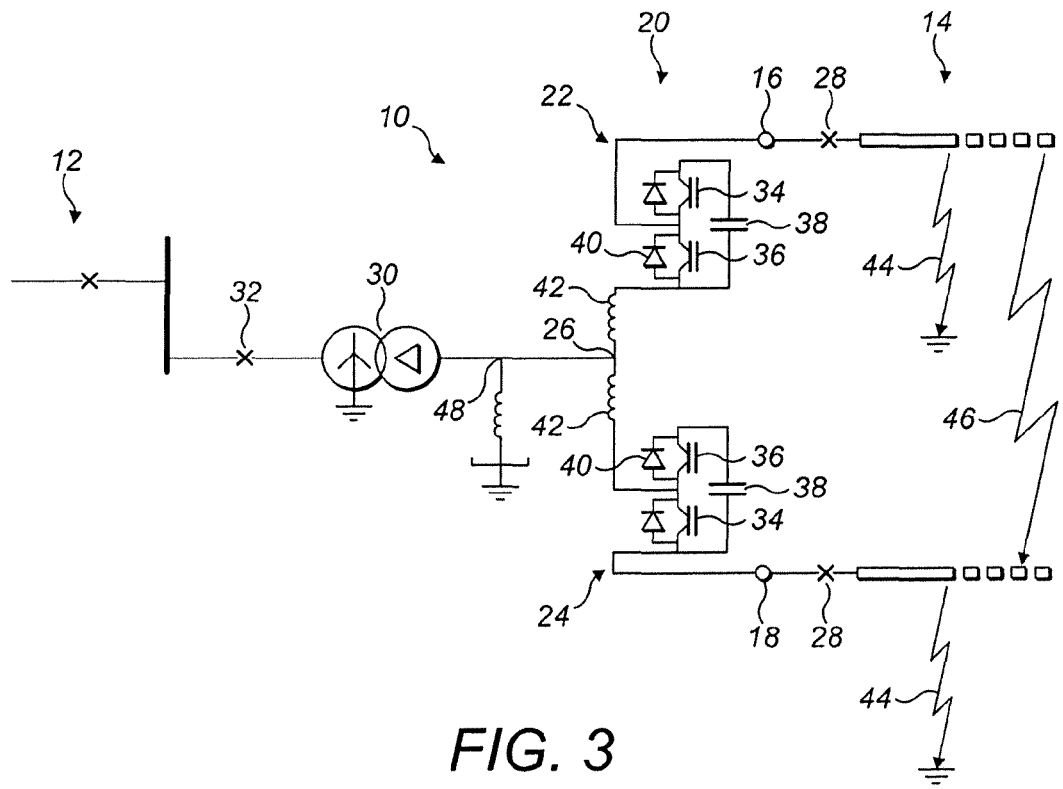
FIG. 3 shows, in schematic form, a second exemplary arrangement of a converter limb of a high impedance grounded VSC, an AC network and a DC network.

FIG. 3 shows, in schematic form, a second, symmetrical monopole circuit arrangement of one of the converter limbs of the high impedance grounded VSC 10, the AC network 12 and the DC network 14. The second arrangement of the VSC 10, the AC network 12 and the DC network 14 in FIG. 3 is similar to the first arrangement shown in FIG. 1, and like features share the same reference numerals. In the second arrangement, the structure and arrangement of the converter limb 20 shown in FIG. 3 is similar to the structure and arrangement of the other converter limbs 20 of the VSC 10.

The second arrangement differs from the first arrangement in that, in the second arrangement:
- a junction between each AC terminal 26 and the transformer 30 defines a high impedance grounding point 48; and
- the first DC terminal 16 is connected to a first pole of the DC network 14 via a first DC circuit breaker 28, while the second DC terminal 18 is connected to a second pole of the DC network 14 via a second DC circuit breaker 28.

A fault in the DC network 14 may be in the form of a pole-to-ground fault 44 that involves either pole, or a pole-to-pole fault 46, as shown in FIG. 3.

In the event of a fault 44,46 occurring in the DC network 14, the method of fault clearance for a VSC 10 as described above and shown in FIG. 2 is carried out to clear the fault 44,46. In the method, it is necessary to switch both DC circuit breakers 28 in parallel when opening or closing each DC circuit breaker 28.

Figure 4:
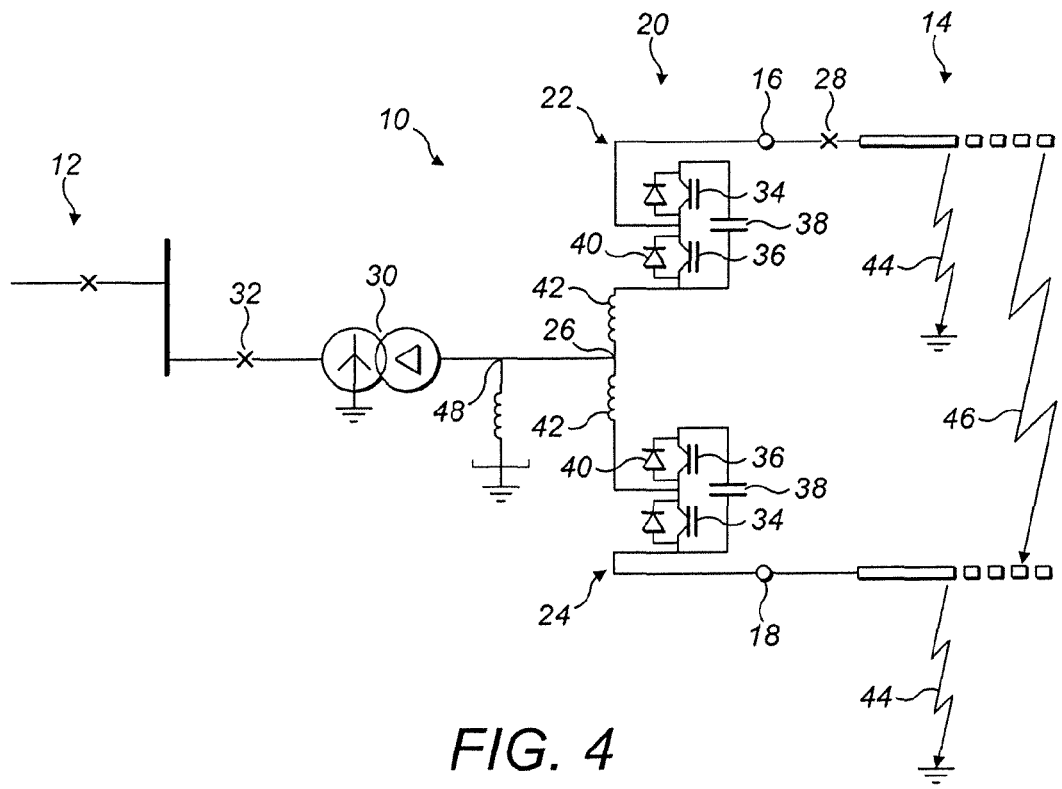
FIG. 4 shows, in schematic form, a third exemplary arrangement of a converter limb of a high impedance grounded VSC, an AC network and a DC network.

FIG. 4 shows, in schematic form, a third, symmetrical monopole circuit arrangement of one of the converter limbs of the high impedance grounded VSC 10, the three-phase AC network 12 and the DC network 14. The third arrangement of the VSC 10, the AC network 12 and the DC network 14 in FIG. 4 is similar to the second arrangement shown in FIG. 3, and like features share the same reference numerals. In the third arrangement, the structure and arrangement of the converter limb 20 shown in FIG. 3 is similar to the structure and arrangement of the other converter limbs 20 of the VSC 10.

The third arrangement differs from the second arrangement in that, in the second arrangement:
- the first DC terminal 16 is connected to a first pole of the DC network 14 via a DC circuit breaker 28, while the second DC terminal 18 is directly connected to a second pole of the DC network 14.

It is envisaged that, in another arrangement, the first DC terminal 16 is directly connected to a first pole of the DC network 14, while the second DC terminal 18 is connected to a second pole of the DC network 14 via a DC circuit breaker 28.

A fault in the DC network 14 may be in the form of a pole-to-ground fault 44 that involves either pole, or a pole-to-pole fault 46, as shown in FIG. 4. Each fault 44,46 may lead to different types of current flow in the DC network 14 and VSC 10, each of which may be interrupted by opening the DC circuit breaker 28.

A fault between the two poles of the DC network 14, i.e. a pole-to-pole fault 46, represents a worst case scenario of a DC side fault in terms of magnitude of current. The fault current caused by the pole-to-pole fault 46 is interrupted by opening the DC circuit breaker 28, which is inherently in series with a current path of the DC fault current.

In the event of a pole-to-ground fault 44 that involves the first pole, the resulting capacitive discharge current can be interrupted by opening the DC circuit breaker 28.

In the event of a pole-to-ground fault 44 that involves the second pole, the pole-to-ground fault 44 will experience a persistent current flow, which is associated with discharge of stored energy in the second pole to ground. However, since the VSC 10 is grounded through the high impedance grounding point 48, the majority of the discharged current that will flow through the DC network 14 will also follow a path that passes through the VSC 10. This allows the DC circuit breaker 28 connected to the first pole to be opened in order to interrupt the current associated with the second pole.

In the event of a fault 44,46 occurring in the DC network 14, the method of fault clearance for a VSC 10 as described above and shown in FIG. 2 is carried out to clear the fault 44,46.

The invention claimed is:

1. A method of fault clearance for a voltage source converter that interconnects a DC network and an AC network, the voltage source converter being connected to the DC network via one or more DC circuit interruption devices, the method comprising the steps of:
   (a) detecting a fault in the DC network; and
   (b) carrying out a primary protection sequence, wherein the step of carrying out the primary protection sequence involves carrying out a first sub-sequence that includes the steps of:
      i. opening the one or more DC circuit interruption devices,
      ii. setting a DC power order of the voltage source converter to zero, and
      iii controlling the voltage source converter to exchange reactive power with the AC network;
   wherein the step of carrying out the primary protection sequence involves the steps of:
      a. counting a re-close time;
      b. carrying out the first sub-sequence;
      c. checking whether the re-close time has elapsed; and
      d. repeating the first sub-sequence if the re-close time has not elapsed;
   and wherein the step of carrying out the primary protection sequence further involves the step of carrying out a second sub-sequence if the re-close time has elapsed, the second sub-sequence including the steps of:
      i. closing the or each DC circuit interruption device;
      ii. setting a DC power order of the voltage source converter to a non-zero level that is below a pre-fault DC power order of the voltage source converter;
      iii controlling the voltage source converter to exchange reactive power with the AC network;
      iv detecting whether the fault is still present in the DC network; and
      v. restoring the DC power order of the voltage source converter to its pre-fault value if the fault is not detected in the DC network, and repeating the step of carrying out the primary protection sequence if the fault is detected in the DC network.

2. A method according to claim 1, wherein the primary protection sequence is repeated if the fault is detected in the DC network and if the number of times that the primary protection sequence has been carried out is below a predetermined number.

3. A method according to claim 2 further including the steps of:
  i. opening the one or more DC circuit interruption devices;
  ii. setting a DC power order of the voltage source converter to zero; and
  iii. controlling the voltage source converter to exchange reactive power with the AC network;
  when the number of times that the primary protection sequence has been carried out is equal to the predetermined number.

4. A method according to claim 1, wherein the voltage source converter is connected to the AC network via one or more AC circuit interruption devices, the method further including the step of carrying out a back-up protection sequence that involves the steps of:
  a. counting a back-up protection time after the step of detecting a fault in the DC network;
  b. opening the one or more AC circuit interruption devices after the back-up protection time has elapsed; and
  c. switching the voltage source converter to a current blocking state.

\* \* \* \* \*